(12) United States Patent
Hiroki

(10) Patent No.: US 9,137,460 B2
(45) Date of Patent: Sep. 15, 2015

(54) DISPLAY APPARATUS, CONTROL METHOD FOR DISPLAY APPARATUS, AND COMPUTER PROGRAM

(71) Applicant: CANON KABUSHIKI KAISHA, Tokyo (JP)

(72) Inventor: Shigeru Hiroki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/281,197

(22) Filed: May 19, 2014

(65) Prior Publication Data

US 2014/0340581 A1 Nov. 20, 2014

Related U.S. Application Data

(63) Continuation of application No. 12/993,598, filed as application No. PCT/JP2009/062071 on Jun. 25, 2009, now Pat. No. 8,780,274.

(30) Foreign Application Priority Data

Jun. 30, 2008 (JP) ................................. 2008-171247

(51) Int. Cl.
*H04N 5/268* (2006.01)
*H04N 5/44* (2011.01)
(Continued)

(52) U.S. Cl.
CPC ................ *H04N 5/268* (2013.01); *G03B 21/14* (2013.01); *G09G 5/006* (2013.01); *H04N 9/3141* (2013.01); *G09G 2320/103* (2013.01);
(Continued)

(58) Field of Classification Search
CPC ... H04N 5/4401; H04N 5/44; H04N 5/44543; H04N 5/44513; H04N 5/46; H04N 5/268; H04N 5/775; H04N 5/455; H04N 5/50; H04N 7/1022; H04N 7/17318; H04N 7/163; H04N 21/4126; H04N 21/482; H04N 9/642
USPC ................. 348/552, 553, 558, 705, 706, 725; 725/59, 133, 141, 153
IPC ..................................... H04N 7/00, 5/44, 5/268
See application file for complete search history.

(56) References Cited

U.S. PATENT DOCUMENTS 6,580,447 B2    6/2003   Shimizu et al.
6,860,609 B2    3/2005   Olson et al.
(Continued)

FOREIGN PATENT DOCUMENTS

CN    1475899 A    2/2004
CN    1574924 A    2/2005
(Continued)

OTHER PUBLICATIONS

Jun. 17, 2014, Chinese Official Action (with English translation) in Chinese Patent Appln. No. 200980125306.7.
(Continued)

*Primary Examiner* — Sherrie Hsia
(74) *Attorney, Agent, or Firm* — Fitzpatrick, Cella, Harper & Scinto

(57) ABSTRACT

Upon bringing a digital camera having a near field wireless communication function close to a projector while a display apparatus displays a screen of a PC using the projector, the display apparatus decodes and displays an image from the digital camera in place of the screen of the PC.

12 Claims, 13 Drawing Sheets

(51) Int. Cl.
  *H04N 7/00*   (2011.01)
  *G03B 21/14*  (2006.01)
  *G09G 5/00*   (2006.01)
  *H04N 9/31*   (2006.01)

(52) U.S. Cl.
  CPC ..... *G09G 2340/10* (2013.01); *G09G 2340/125* (2013.01); *G09G 2360/10* (2013.01); *G09G 2370/16* (2013.01)

(56) References Cited

U.S. PATENT DOCUMENTS

| | | | |
|---|---|---|---|
| 7,350,923 | B2 | 4/2008 | Olson et al. |
| 7,453,520 | B2 | 11/2008 | Kim |
| 8,154,658 | B2 | 4/2012 | Dai et al. |
| 8,203,655 | B2 | 6/2012 | Chao et al. |
| 8,253,857 | B2 | 8/2012 | Koike et al. |
| 2003/0234776 | A1 | 12/2003 | Konishi |
| 2004/0041989 | A1 | 3/2004 | Olson et al. |
| 2004/0263694 | A1 | 12/2004 | Kim |
| 2005/0140928 | A1 | 6/2005 | Olson et al. |
| 2006/0124897 | A1 | 6/2006 | Shingai et al. |
| 2013/0100094 | A1 | 4/2013 | Shingai et al. |

FOREIGN PATENT DOCUMENTS

| | | | |
|---|---|---|---|
| CN | 1797173 | A | 7/2006 |
| CN | 1802685 | A | 7/2006 |
| CN | 1833196 | A | 9/2006 |
| JP | 07-154716 | A | 6/1995 |
| JP | 2001-028740 | A | 1/2001 |
| JP | 2001-339355 | A | 12/2001 |
| JP | 2002-108321 | A | 4/2002 |
| JP | 2003-304411 | A | 10/2003 |
| JP | 2004-221908 | A | 8/2004 |
| JP | 2006-023551 | A | 1/2006 |
| JP | 2007-158404 | A | 6/2007 |
| JP | 2008-139358 | A | 6/2008 |

OTHER PUBLICATIONS

Chinese Office Action dated Nov. 26, 2012, in related Chinese Application No. 200980125306.7 (with English translation).

Notification of Transmittal of the International Search Report and the Written Opinion of the International Searching Authority dated Oct. 6, 2009, in related PCT International Application No. PCT/JP2009/062071.

Chinese Office Action dated Jun. 19, 2013, in related Chinese Application No. 200980125306.7.

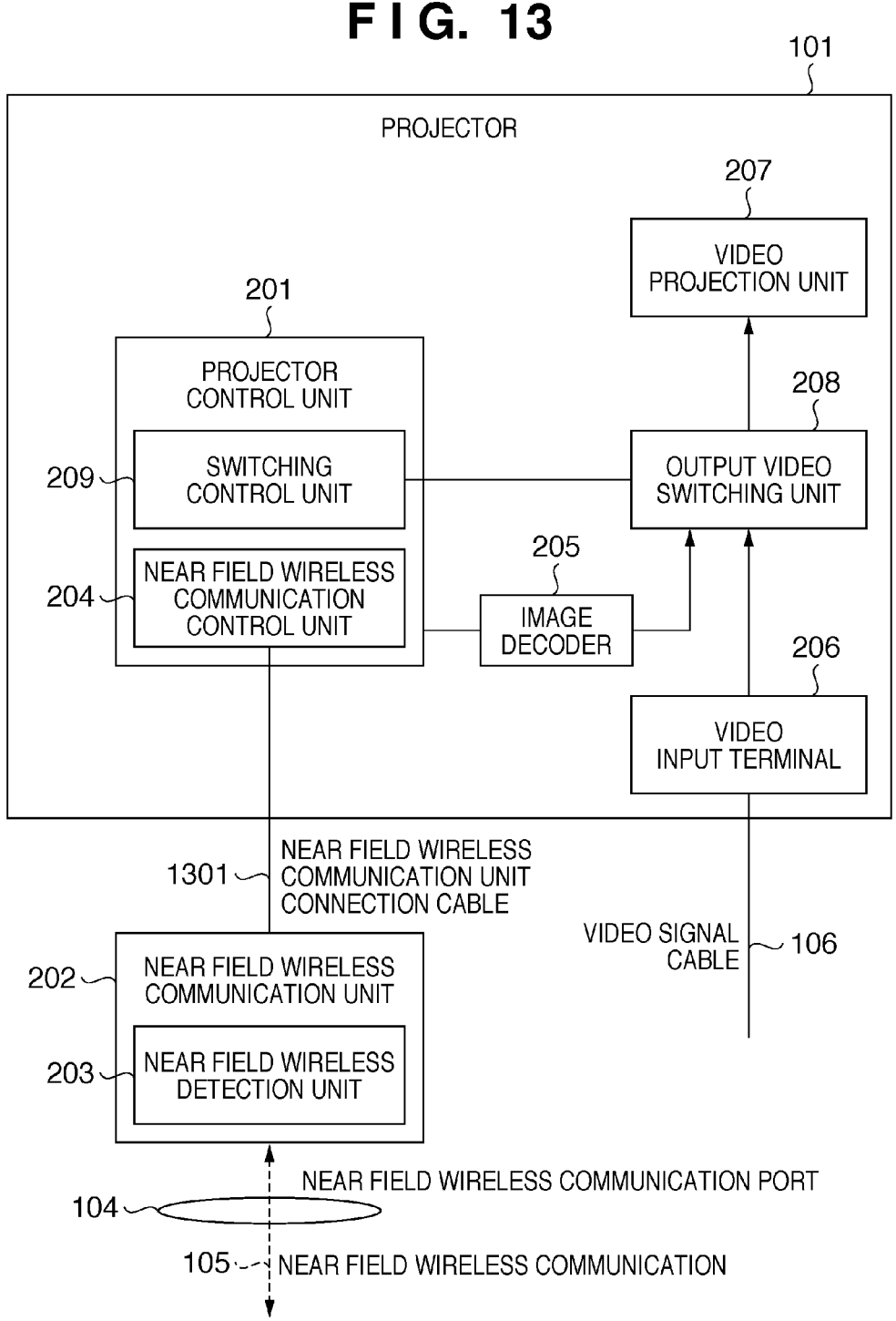

DISPLAY APPARATUS, CONTROL METHOD FOR DISPLAY APPARATUS, AND COMPUTER PROGRAM

This application is a continuation of U.S. patent application Ser. No. 12/993,598 filed Nov. 19, 2010, U.S. Pat. No. 8,780,274 B2, which was the National Stage of International Appln. No. PCT/JP2009/062071 filed Jun. 25, 2009, and also claims priority to Japanese Patent Application No. 2008-171247 filed Jun. 30, 2008, which are herein incorporated by reference in their entirety.

TECHNICAL FIELD

The present invention relates to a display technique of inputting and displaying a video signal.

BACKGROUND ART

To allow a plurality of users to look at the same display screen, there is a method of connecting a video output of a PC (Personal Computer) to a video input of a projector, and projecting the display screen of the PC by the projector. A projector has been mainly used for projecting the display screen of one PC. In recent years, however, a projector is also used for projecting the display screen of one of PCs brought by a plurality of users while switching the PCs during the progress of a conference. When displaying the screen of one of a plurality of PCs while switching the PCs, the following method is adopted. That is, a video output of each PC is connected to a video input of a switching unit having a plurality of inputs, and a PC whose screen is to be projected by a projector is selected by operating a switch of the switching unit. In this case, it is cumbersome to move to a place where the switching unit is, and then operate it. Japanese Patent Laid-Open No. 2002-108321 has disclosed a technique with which the operator of a PC can switch the switching unit at hand. Japanese Patent Laid-Open No. 2006-23551 has disclosed a projector incorporating a switching function.

Furthermore, a projector can display an image of an image capturing apparatus such as a digital camera in place of the display screen of a PC. When displaying an image of a digital camera, the digital camera is connected to a projector via a cable such as a USB or LAN cable, and transmits an image file to the projector. The projector decodes and displays the transmitted image file.

Conventionally, however, when switching a video projected by a projector between the display screen of a PC and an image of a digital camera, a switching operation is necessary.

DISCLOSURE OF INVENTION

The present invention provides a display technique which can automatically switch a display between an image from a video input terminal and that from a wireless interface so that it is possible to perform display processing which reflects user's intention.

According to one aspect of the present invention, there is provided a display apparatus comprising a detection unit configured to detect connection with an external apparatus via a wireless interface, or disconnection with the external apparatus via the wireless interface, while displaying a video signal from a video input terminal, and a display unit configured to display an image received from the external apparatus via the wireless interface when the connection with the external apparatus has been detected by the detection unit. The display unit also switches the display state of the image received from the external apparatus to a state where the image received from the external apparatus is not displayed and where the video signal input from the video input terminal is displayed when a change from the detection to the disconnection with the external apparatus has been detected by the detection unit.

According to another aspect of the present invention, there is provided a display apparatus comprising a detection unit configured to detect connection with a first external apparatus via a wireless interface, while displaying a video signal from a video input terminal, and a monitoring unit configured to monitor a change in the video signal from the video input terminal, wherein the video signal from the video input terminal is a video signal corresponding to an image from a second external apparatus, and the change in the video signal is generated when the image from the second external apparatus is switched to other images. In addition, a display unit is configured to display an image received from the first external apparatus via the wireless interface when the connection with the first external apparatus has been detected by the detection unit, and switch the display state of the image received from the first external apparatus to a state where the image received from the first external apparatus is not displayed and where the video signal from the video input terminal is displayed when the change in the video signal has been monitored by the monitoring unit.

According to yet another aspect of the present invention, there is provided a control method performed by a display apparatus comprising a detection step of detecting connection with an external apparatus via a wireless interface or disconnection with the external apparatus via a wireless interface, while displaying a video signal from a video input terminal, and a display step of displaying an image received from the external apparatus via the wireless interface when the connection with the external apparatus has been detected in the detection step, and switching the display state of the image received from the external apparatus to a state where the image received from the external apparatus is not displayed and where the video signal input from the video input terminal is displayed when a change from the detection to the disconnection with the external apparatus has been detected.

According to another aspect of the present invention, there is provided a computer-readable storage medium storing a computer program which causes a computer to execute a control method comprised of a detection step of detecting connection with an external apparatus via a wireless interface or disconnection with the external apparatus via a wireless interface, while displaying a video signal from a video input terminal, and a display step of displaying an image received from the external apparatus via the wireless interface when the connection with the external apparatus has been detected in the detection step, and switching the display state of the image received from the external apparatus to a state where the image received from the external apparatus is not displayed and where the video signal input from the video input terminal is displayed when a change from the detection to the disconnection with the external apparatus has been detected.

According to yet another aspect of the present invention, there is provided a control method performed by a display apparatus. The method comprises a detection step of detecting connection with a first external apparatus via a wireless interface, while displaying a video signal from a video input terminal, and a monitoring step of monitoring a change in the video signal from the video input terminal, wherein the video signal from the video input terminal is a video signal corresponding to an image from a second external apparatus, and the change in the video signal is generated when the image from the second external apparatus is switched to other images. Additionally, a display step displays an image received from the first external apparatus via the wireless interface when the connection with the first external apparatus has been detected in the detection step, and switches the display state of the image received from the first external apparatus to a state where the image received from the first external apparatus is not displayed and where the video signal from the video input terminal is displayed when the change in the video signal has been monitored in the monitoring step.

According to another aspect of the present invention, there is provided a computer-readable storage medium storing a computer program which causes a computer to execute a control method comprised of a detection step of detecting connection with a first external apparatus via a wireless interface, while displaying a video signal from a video input terminal, and a monitoring step of monitoring a change in the video signal from the video input terminal, wherein the video signal from the video input terminal is a video signal corresponding to an image from a second external apparatus, and the change in the video signal is generated when the image from the second external apparatus is switched to other images. In addition, a display step displays an image received from the first external apparatus via the wireless interface when the connection with the first external apparatus has been detected in the detection step, and switches the display state of the image received from the first external apparatus to a state where the image received from the first external apparatus is not displayed and where the video signal from the video input terminal is displayed when the change in the video signal has been monitored in the monitoring step.

According to the present invention, it is possible to automatically switch a display between an image from a video input terminal and that from a wireless interface with an easy operation. For example, it is possible to switch between a projected video and an image of an image capturing apparatus such as a digital camera only by bringing the image capturing apparatus close to or away from a projector, thereby omitting a cumbersome switching operation.

Further features of the present invention will become apparent from the following description of exemplary embodiments with reference to the attached drawings.

BRIEF DESCRIPTION OF DRAWINGS

FIG. 13 is a block diagram showing a projector 101 according to the sixth embodiment of the present invention.

BEST MODE FOR CARRYING OUT THE INVENTION

Embodiments of the present invention will be illustrated in detail hereinafter with reference to the accompanying drawings. Note that components described in the embodiments are merely examples, and the technical scope of the present invention is defined by the appended claims but it is not limited by each individual embodiment to be described hereinafter.

First Embodiment

Figure 1:
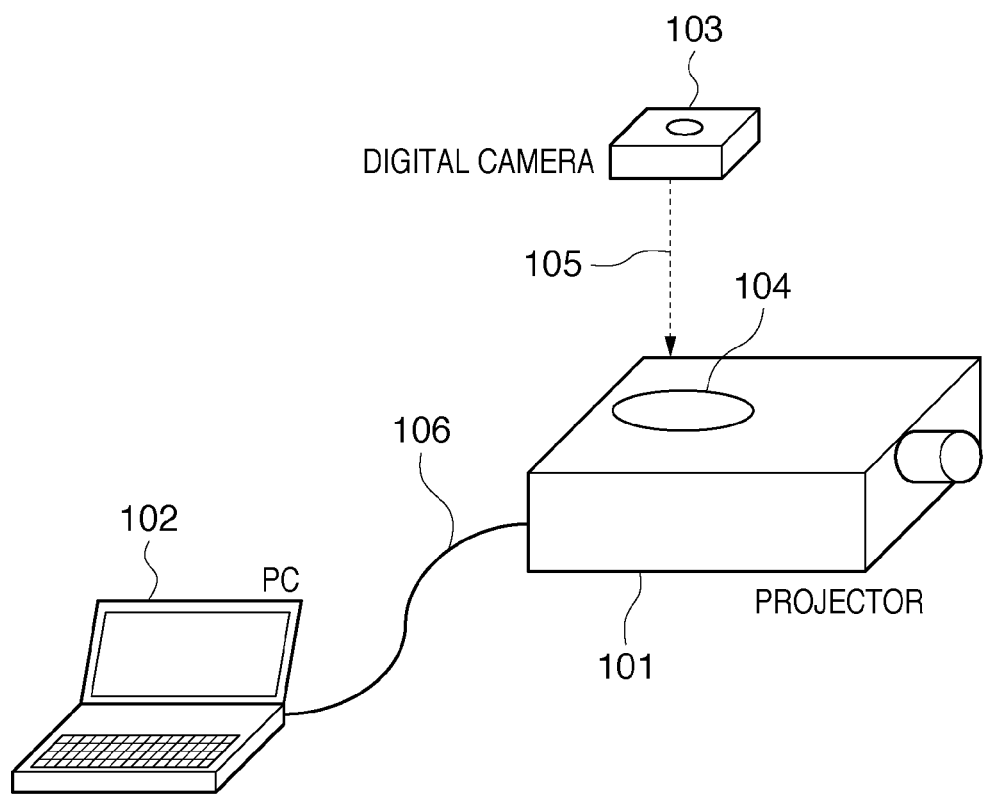
FIG. 1 is a view showing a system configuration of the present invention.

FIG. 1 is a view showing a system configuration to represent the characteristics of this embodiment. Reference numeral 101 denotes a projector according to the first embodiment. A system of the present invention includes the projector 101, a PC (Personal Computer) 102, and a digital camera 103.

Reference numeral 104 denotes a near field wireless communication port; and 105, near field wireless communication. The digital camera 103 can perform communication using the near field wireless communication 105 in short transmission distance by being brought close to the near field wireless communication port 104 of the projector 101. The near field wireless communication 105 includes noncontact IC card wireless communication and NFC (Near Field Communication) using electromagnetic induction, and communication using an induced electric field. In the near field wireless communication 105, the projector 101 and digital camera 103 can communicate only within a distance of several cm from each other. In general, when the digital camera 103 comes within a communicable distance from the projector 101, data transfer is automatically started.

Reference numeral 106 denotes a video signal cable which connects the projector 101 and PC 102, and transmits a video signal. As an example of the video signal cable, a D-sub 15 pin cable and BNC cable for transmitting analog RGB signals, and a DVI cable for transmitting digital RGB signals are available.

Figure 2:
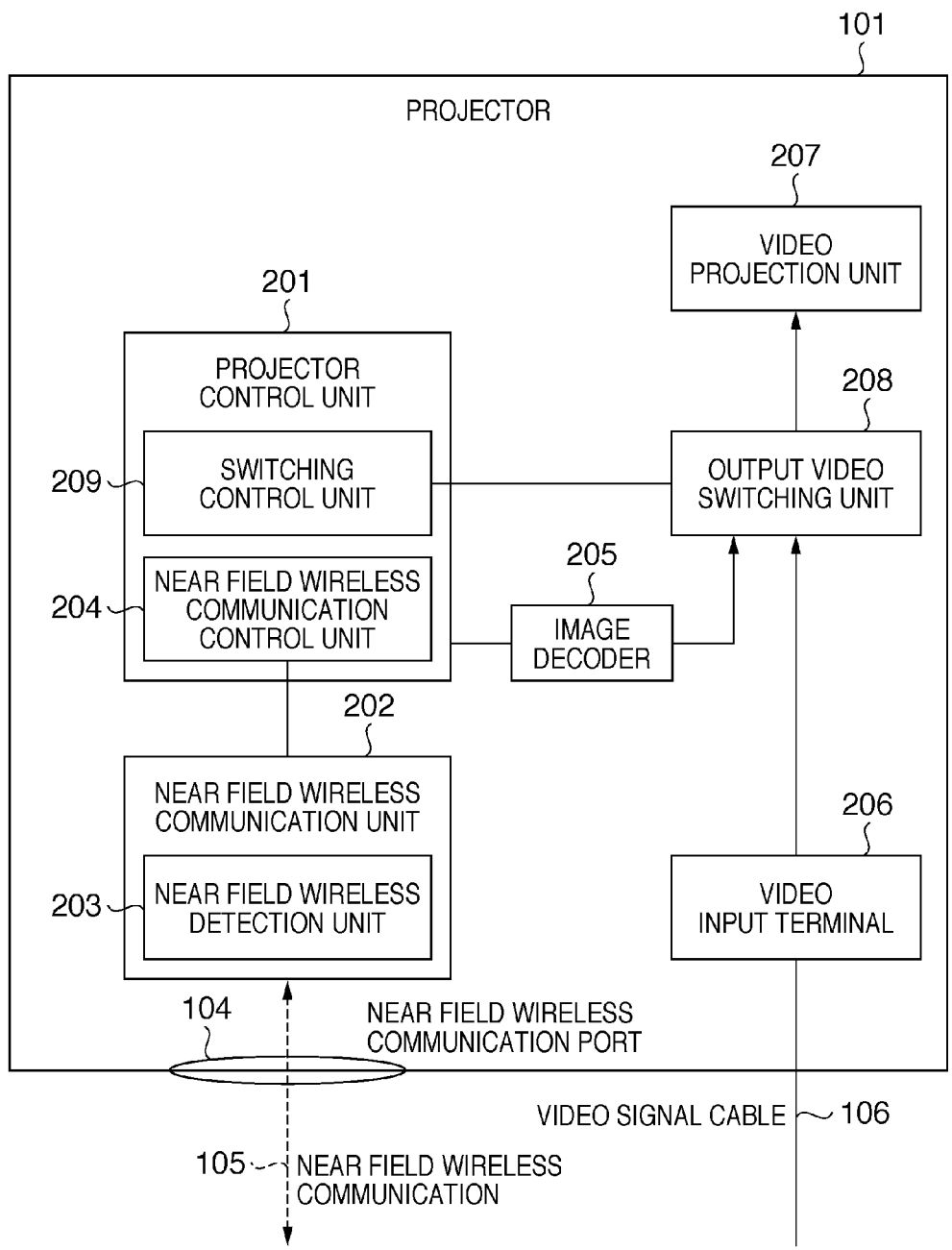
FIG. 2 is a block diagram showing a projector 101 according to the first embodiment of the present invention.

FIG. 2 is a block diagram showing the projector 101.

Reference numeral 201 denotes a projector control unit which controls the projector 101. The projector control unit 201 generally includes a CPU. Reference numeral 202 denotes a near field wireless communication unit which performs the near field wireless communication 105; and 203, a near field wireless detection unit 203 which detects connection and disconnection of near field wireless communication. The near field wireless detection unit 203 detects connection when another apparatus capable of performing communication using the near field wireless communication 105 comes close to a region within a near field wireless communication range. In contrast, the unit 203 detects disconnection when the other apparatus moves away from the region within the near field wireless communication range. Reference numeral 204 denotes a near field wireless communication control unit which controls the near field wireless communication unit 202. The near field wireless communication control unit 204 also controls reception of a file from a connection partner by the near field wireless communication 105. Reference numeral 205 denotes an image decoder which decodes an image file and outputs a video signal. The image decoder 205 decodes an image compressed in a JPEG format, and continuously outputs a decoded image as a video signal. Reference numeral 206 denotes a video input terminal. As an input terminal of the projector 101, an analog RGB terminal connected with a D-sub 15 pin cable or BNC cable, and a digital RGB terminal such as a DVI terminal are generally available. The video input terminal for a digital signal has a function of decoding a digital signal to obtain a video signal in a succeeding stage. Reference numeral 207 denotes a video projection unit which projects a video signal; 208, an output video switching unit which outputs, to the video projection unit 207, one of a video signal from the image decoder 205 and an input from the video input terminal 206; and 209, a switching control unit which controls switching of the output video switching unit 208.

Figure 3:
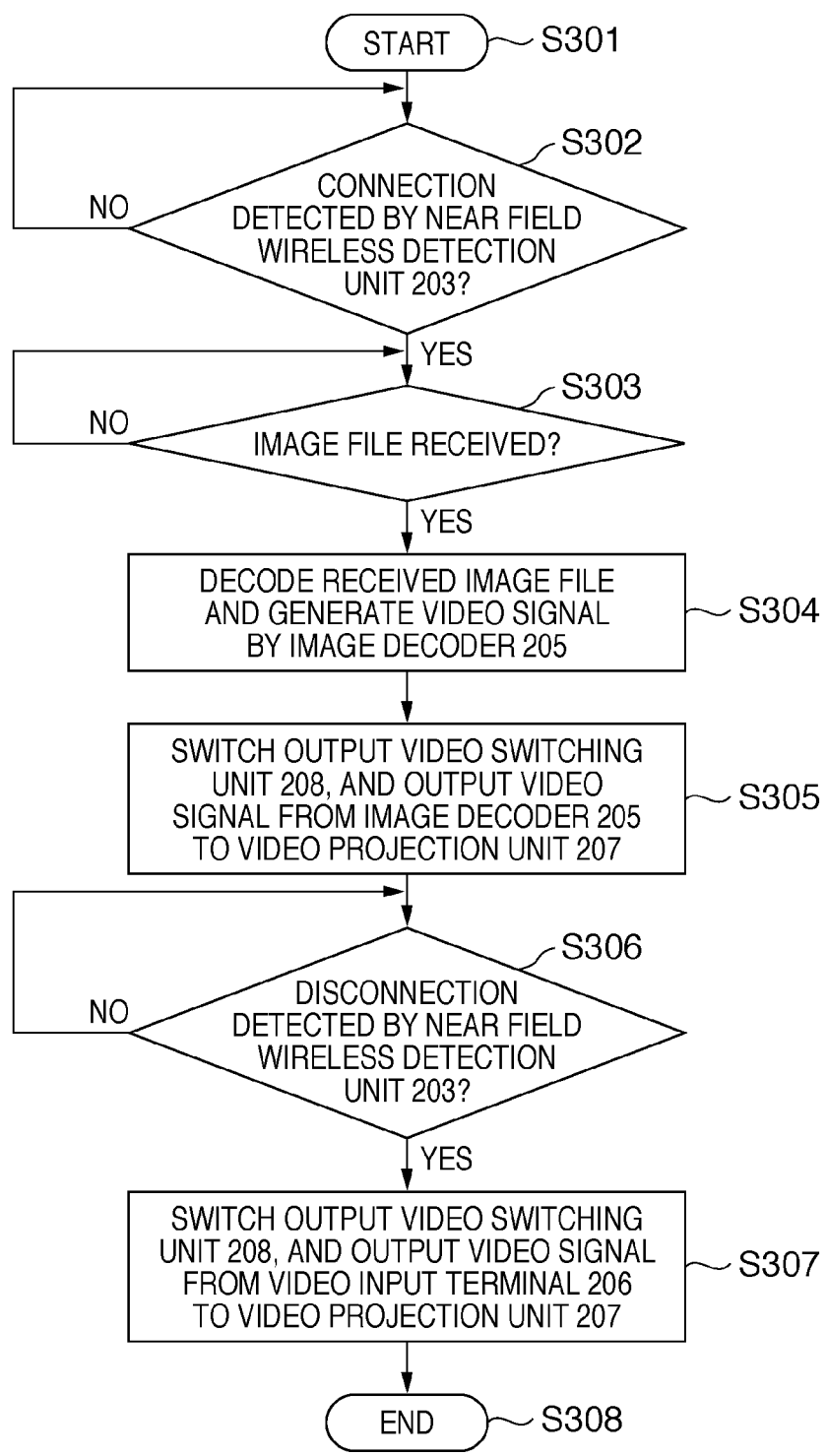
FIG. 3 is a flowchart illustrating the operation of the projector 101 according to the first embodiment of the present invention.

FIG. 3 is a flowchart illustrating the operation of the projector 101.

The first embodiment will be explained below with reference to the system configuration of FIG. 1, the block diagram of FIG. 2, and the flowchart of FIG. 3.

In an initial state (S301), the projector 101 is connected with the PC 102 via the video signal cable 106, and is projecting an output image of the PC 102. A path of a video signal within the projector 101 will be described below. A video signal input from the video input terminal 206 is input to the output video switching unit 208. In the initial state, the switching control unit 209 controls the output video switching unit 208 to output the video signal from the video input terminal 206. The video signal output from the output video switching unit 208 is input to the video projection unit 207 and is then projected.

When the operator of the digital camera 103 wants to display an image of an image file saved in the digital camera 103, he/she operates the digital camera 103 to select the image file of his/her choice. In general, the image of the image file is displayed on a display unit of the digital camera 103. In this state, the operator brings the digital camera 103 close to the near field wireless communication port 104 of the projector 101. The digital camera 103 detects that the near field wireless communication 105 can be performed, and transfers the selected image file to the projector 101 by the near field wireless communication 105.

The near field wireless detection unit 203 of the projector 101 monitors connection of the near field wireless communication 105 (S302). Upon detecting connection, the projector 101 stands by for transfer of the image file from the connection partner (S303).

The near field wireless communication control unit 204 receives the image file, and transfers the received image file to the image decoder 205. The image file transmitted to the image decoder 205 is decoded, output as a video signal from the image decoder 205, and input to the output video switching unit 208 (S304). The video signal from the image decoder 205 is continuously output until a next image is decoded or the projector control unit 201 controls to stop outputting the video signal. When the video signal from the image decoder 205 is input, the switching control unit 209 controls to switch the output video switching unit 208 to output the video signal from the image decoder 205 to the video projection unit 207 (S305). With the above operation, the video projection unit 207 projects the video obtained by decoding the image file transferred from the digital camera 103.

To stop projecting the image of the digital camera 103 by the projector 101, the operator of the digital camera 103 moves it away from the near field wireless communication port 104 of the projector 101.

The near field wireless detection unit 203 of the projector 101 monitors disconnection of the near field wireless communication 105 (S306). Upon detecting disconnection, the switching control unit 209 controls to switch the output video switching unit 208 to output the video signal from the video input terminal 206 to the video projection unit 207 (S307). With the above operation, the video projection unit 207 projects the output video of the PC 102.

As described above, the projector 101 monitors connection of near field wireless communication during display processing (projection) of a video signal from an information processing apparatus such as a PC. When the digital camera 103 enters the region within the communication range of near field wireless communication (the digital camera 103 comes close to a point a certain distance from a near field wireless communication port), and near field wireless communication is connected, the projector 101 is switched to perform display processing (projection) of an image received by the near field wireless communication. Furthermore, when the digital camera 103 moves away from the region within the communication range of the near field wireless communication (the digital camera 103 moves to a point a certain distance or more from the near field wireless communication port), and the near field wireless communication is disconnected, the projector 101 sets the image of the digital camera to a non-display state, and returns (is switched back) to perform the display processing (projection) of the video signal from the information processing apparatus.

It is, therefore, possible to project an image of the digital camera 103 without any switching operation only by bringing the digital camera 103 close to the projector 101. Furthermore, it is possible to project an original image of the PC 102 only by moving the digital camera 103 away from the projector 101. An operation to do this is easy. That is, a camera in which a projected image has been selected (displayed) is brought close to or away from the near field wireless communication port. When the near field wireless communication port is located on the upper surface of the projector as shown in FIG. 1, the digital camera may be placed on the near field wireless communication port or removed from there.

Second Embodiment

Figure 4:
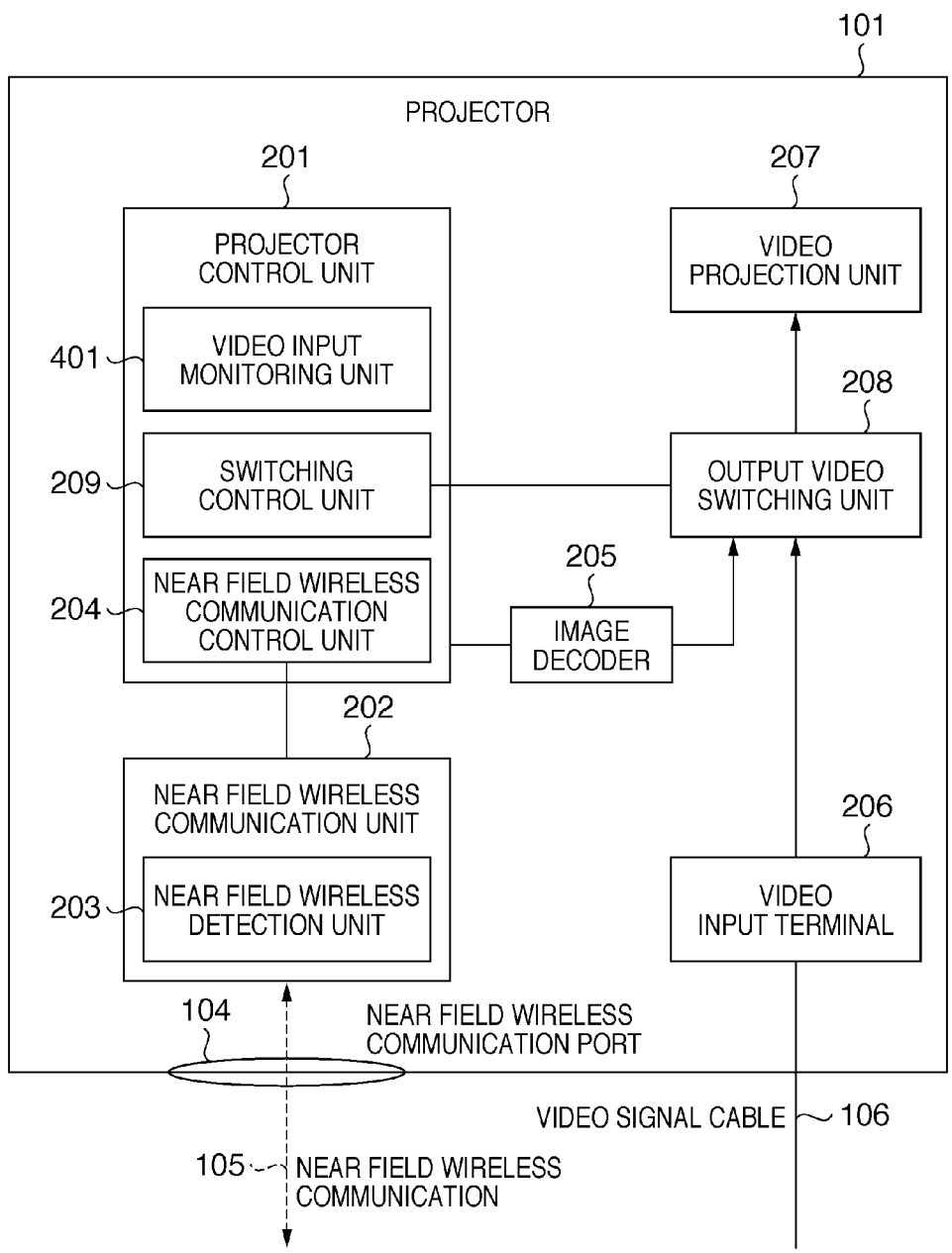
FIG. 4 is a block diagram showing a projector 101 according to the second embodiment of the present invention.

FIG. 4 is a block diagram showing a projector 101 according to the second embodiment.

Reference numeral 401 denotes a video input monitoring unit which monitors a video from a video input terminal 206. The video input monitoring unit 401 monitors whether the video input to the video input terminal 206 changes. Upon detecting a change amount equal to or more than a certain amount, the unit 401 generates a screen change detection event. While the user makes a presentation using a PC 102 and the PC 102 keeps displaying a certain page, the video input monitoring unit 401 generates no screen change detection event since there is no change in the signal from the video input terminal 206. When the PC 102 displays a next page, the video input monitoring unit 401 generates a screen change detection event since there is a change in the signal from the video input terminal 206.

Figure 5:
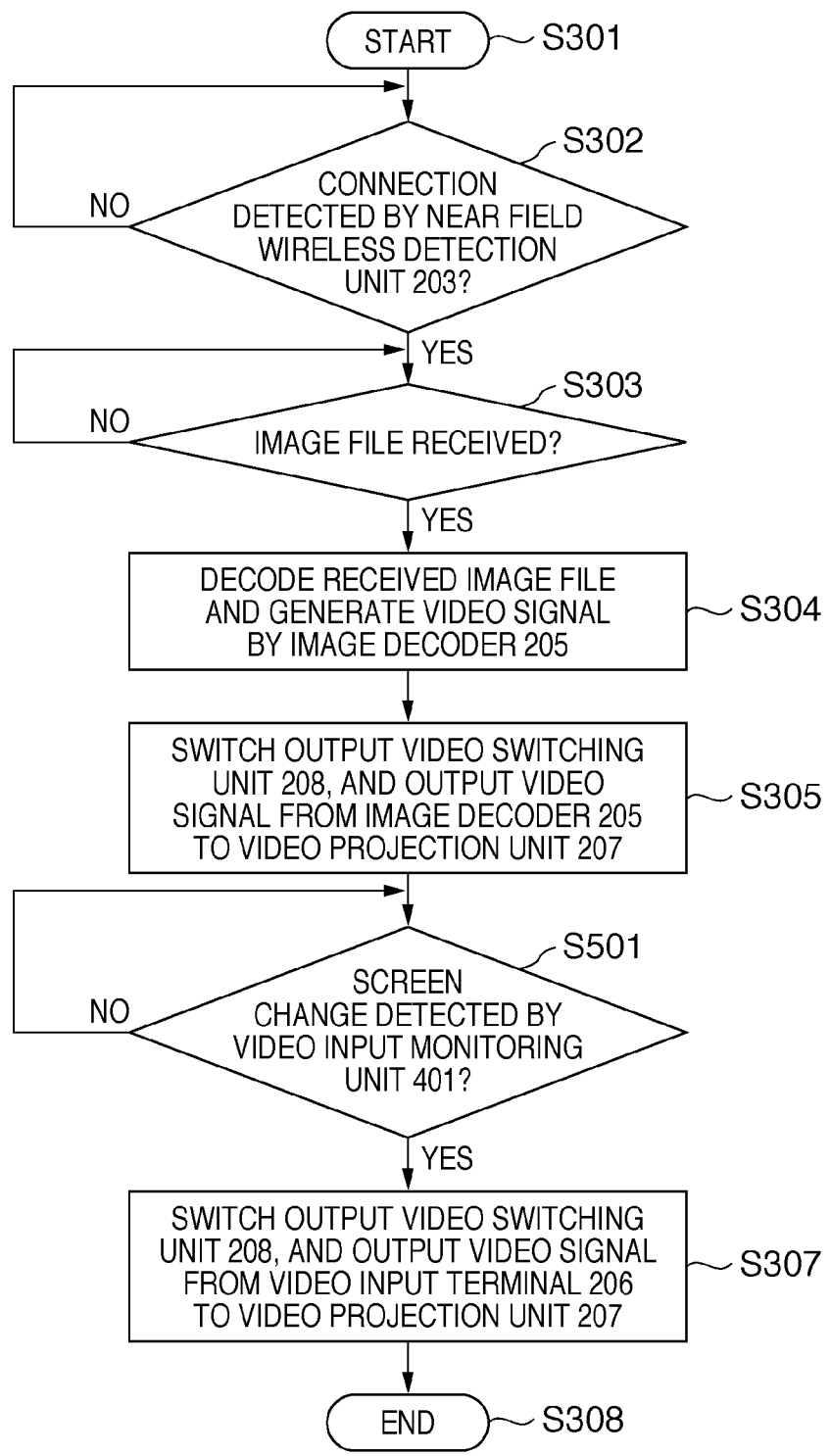
FIG. 5 is a flowchart illustrating the operation of the projector 101 according to the second embodiment of the present invention.

FIG. 5 is a flowchart illustrating the operation of the projector 101 according to the second embodiment.

The second embodiment will be explained below with reference to the system configuration of FIG. 1, the block diagram of FIG. 4, and the flowchart of FIG. 5.

In the second embodiment, processing until a digital camera 103 is brought close to a near field wireless communication port 104, and an image of the digital camera 103 is projected (steps S301 to S305) is as described in the first embodiment. An operation when the operator of the PC 102 operates, for example, a pointing device to display a next page and there is a change in the screen of the PC 102 while the projector 101 projects an image of the digital camera 103 will be explained below.

A change in the screen of the PC 102 changes a video signal to be input to the video input terminal 206. Upon detecting a change in the signal from the video input terminal 206, the video input monitoring unit 401 generates a screen change detection event. The projector control unit 201 of the projector 101 monitors a screen change detection event of the video input monitoring unit 401 (S501). Upon detecting a screen change detection event, a switching control unit 209 controls to switch an output video switching unit 208 to output the video signal from the video input terminal 206 to a video projection unit 207 (S307). With the above operation, an output video of the PC 102 is output to the video projection unit 207 and is then projected.

According to the second embodiment in addition to the effects of the first embodiment, even when the digital camera 103 is close to the projector 101, it is possible to project an image of the PC 102. An operation to do this is easy. That is, it is possible to project an original image of the PC 102 only by changing the image of the PC 102. In other words, it is possible to reflect user's intention to switch a displayed image by changing a page being projected in the PC 102.

Third Embodiment

Figure 6:
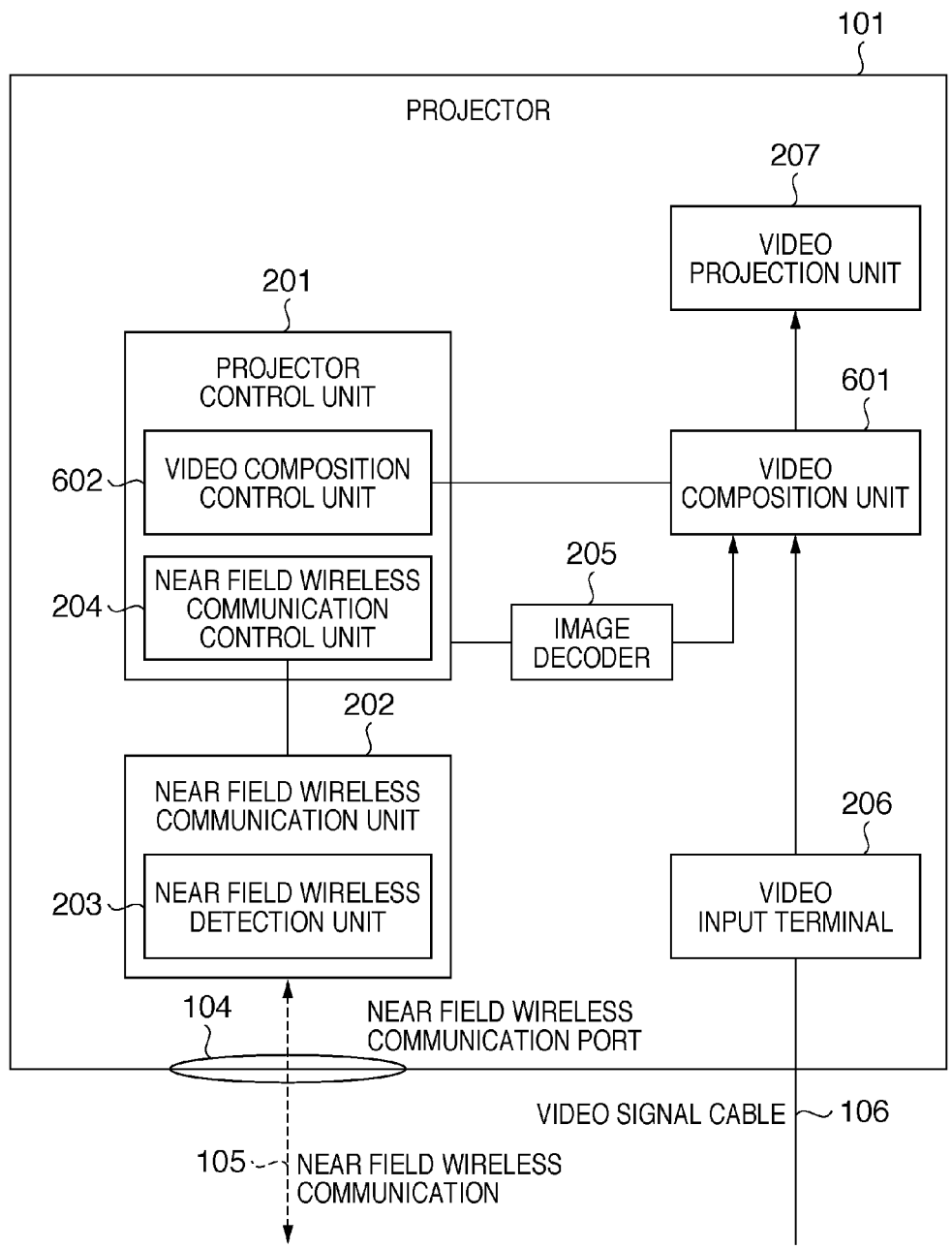
FIG. 6 is a block diagram showing a projector 101 according to the third embodiment of the present invention.

FIG. 6 is a block diagram showing a projector 101 according to the third embodiment.

Reference numeral 601 denotes a video composition unit which composes a video signal from an image decoder 205 and that from a video input terminal 206, and outputs a composed signal to a video projection unit 207; and 602, a video composition control unit which controls the video composition unit 601.

Figure 7:
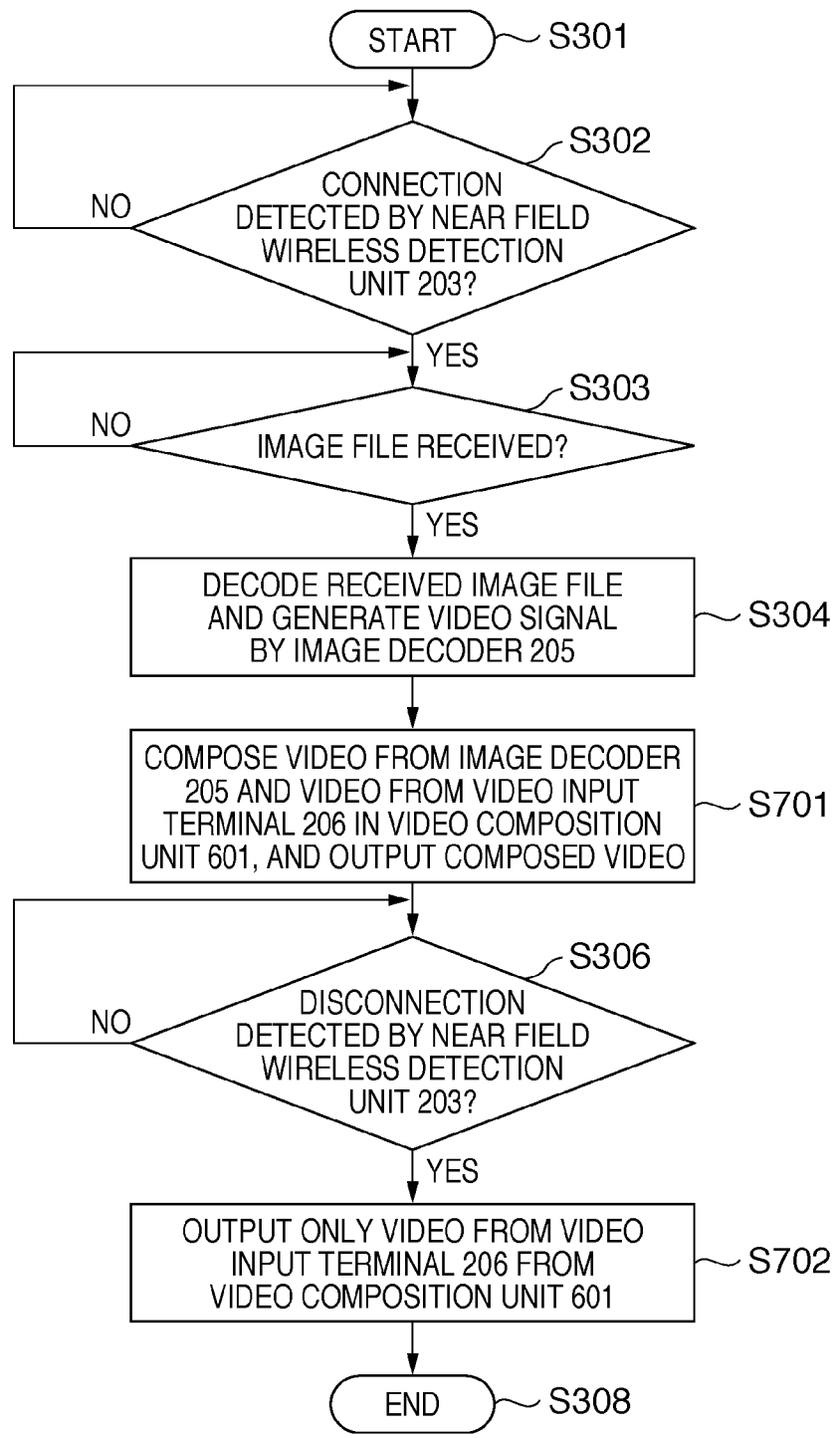
FIG. 7 is a flowchart illustrating the operation of the projector 101 according to the third embodiment of the present invention.

FIG. 7 is a flowchart illustrating the operation of the projector 101 according to the third embodiment.

The third embodiment will be explained below with reference to the system configuration of FIG. 1, the block diagram of FIG. 6, and the flowchart of FIG. 7.

The projector 101 in the third embodiment is different from that in the first embodiment in that the output video switching unit 208 is replaced by the video composition unit 601 and the switching control unit 209 is replaced by the video composition control unit 602. That is, in the first embodiment, the projector 101 switches between a video signal from the image decoder 205 and that from the video input terminal 206. In the third embodiment, however, the projector 101 composes those video signals. The operation of the projector 101 is the same as in the first embodiment except that the projector 101 composes the video signals.

In the third embodiment, when the operator of a digital camera 103 brings it close to a near field wireless communication port 104 of the projector 101 while the projector 101 projects an output image of a PC 102, the projector 101 performs the following operation.

A near field wireless detection unit 203 of the projector 101 monitors connection of near field wireless communication 105 (S302). Upon detecting connection, the projector 101 stands by for an image file to be transferred from the connection partner (S303).

A near field wireless communication control unit 204 receives the image file, and transfers the received image file to the image decoder 205. The image file transmitted to the image decoder 205 is decoded, output as a video signal from the image decoder 205, and input to the video composition unit 601 (S304). The video signal from the image decoder 205 is continuously output until a next image is decoded or the projector control unit 201 controls to stop outputting the video signal. When the video signal from the image decoder 205 is input, the video composition control unit 602 controls the video composition unit 601 to compose the video signal from the image decoder 205 and the video from the video input terminal 206 to newly output a video signal (S701). A composed video signal is output to the video projection unit 207. With the above operation, the video obtained by decoding the image file transferred from the digital camera 103 is composed on the video from the PC 102, and a composed video is output to the video projection unit 207 and is then projected.

Figure 8:
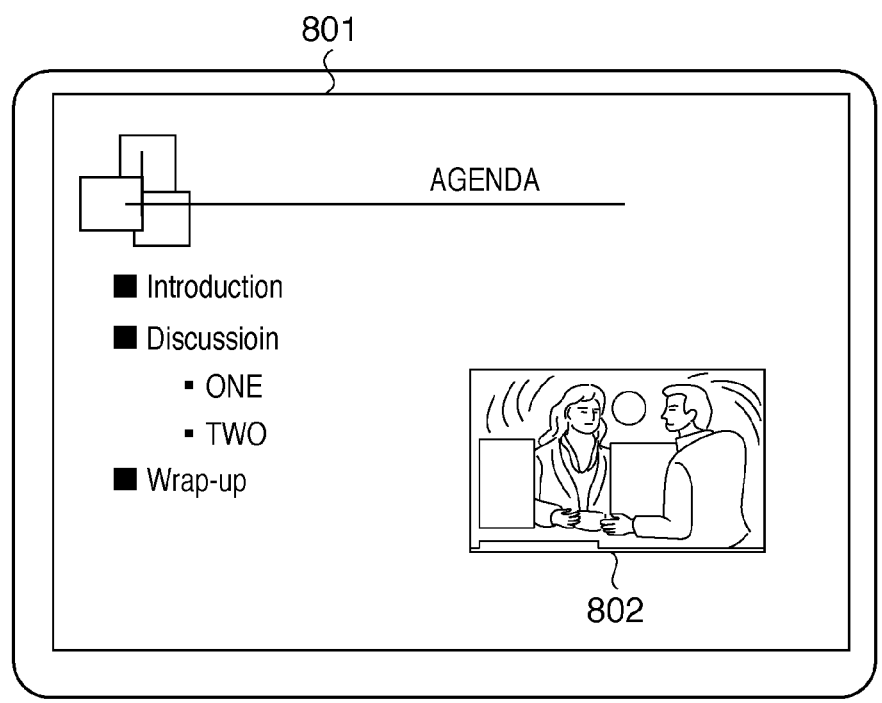
FIG. 8 is a view showing an example of a composed video.

FIG. 8 is a view showing an example of the composed video. An image 802 of the digital camera 103 is composed within an image 801 from the PC 102 in a picture-in-picture format. Although the picture-in-picture format is optimum for a composition method, these images may be composed to be horizontally or vertically aligned in accordance with the intended use of the images.

To stop projecting the image of the digital camera 103, the operator of the digital camera 103 moves it away from the near field wireless communication port 104 of the projector 101.

The near field wireless detection unit 203 of the projector 101 monitors disconnection of the near field wireless communication 105 (S306). Upon detecting disconnection, the video composition control unit 602 controls the video composition unit 601 to only output the video signal from the video input terminal 206 to the video projection unit 207 (S702). With the above operation, only an output video of the PC 102 is output to the video projection unit 207, and is then projected.

In the third embodiment, the video composition control unit 602 controls whether to compose the video signal from the image decoder 205 on that from the video input terminal 206 in the video composition unit 601. In addition to the above method, a method in which the video composition unit 601 always composes the video signal from the image decoder 205 on that from the video input terminal 206 but whether to output the signal from the image decoder 205 is controlled is available. That is, when the near field wireless detection unit 203 detects connection, the image decoder 205 is controlled to output the signal. When the unit 203 detects disconnection, output from the image decoder 205 is stopped. With this processing, when the unit 203 detects connection, the image of the digital camera 103 is composed. When the unit 203 detects disconnection, only the image of the PC 102 is projected.

According to the above embodiments, it is possible to project the image of the digital camera 103 without any switching operation only by bringing the digital camera 103 close to the projector 101. Especially in the third embodiment, since the image of the digital camera 103 is composed on that of the PC 102 in the picture-in-picture format, it is possible to simultaneously check the original image of the PC 102. Furthermore, it is possible to project only the original image of the PC 102 by moving the digital camera 103 away from the projector 101.

Fourth Embodiment

Figure 9:
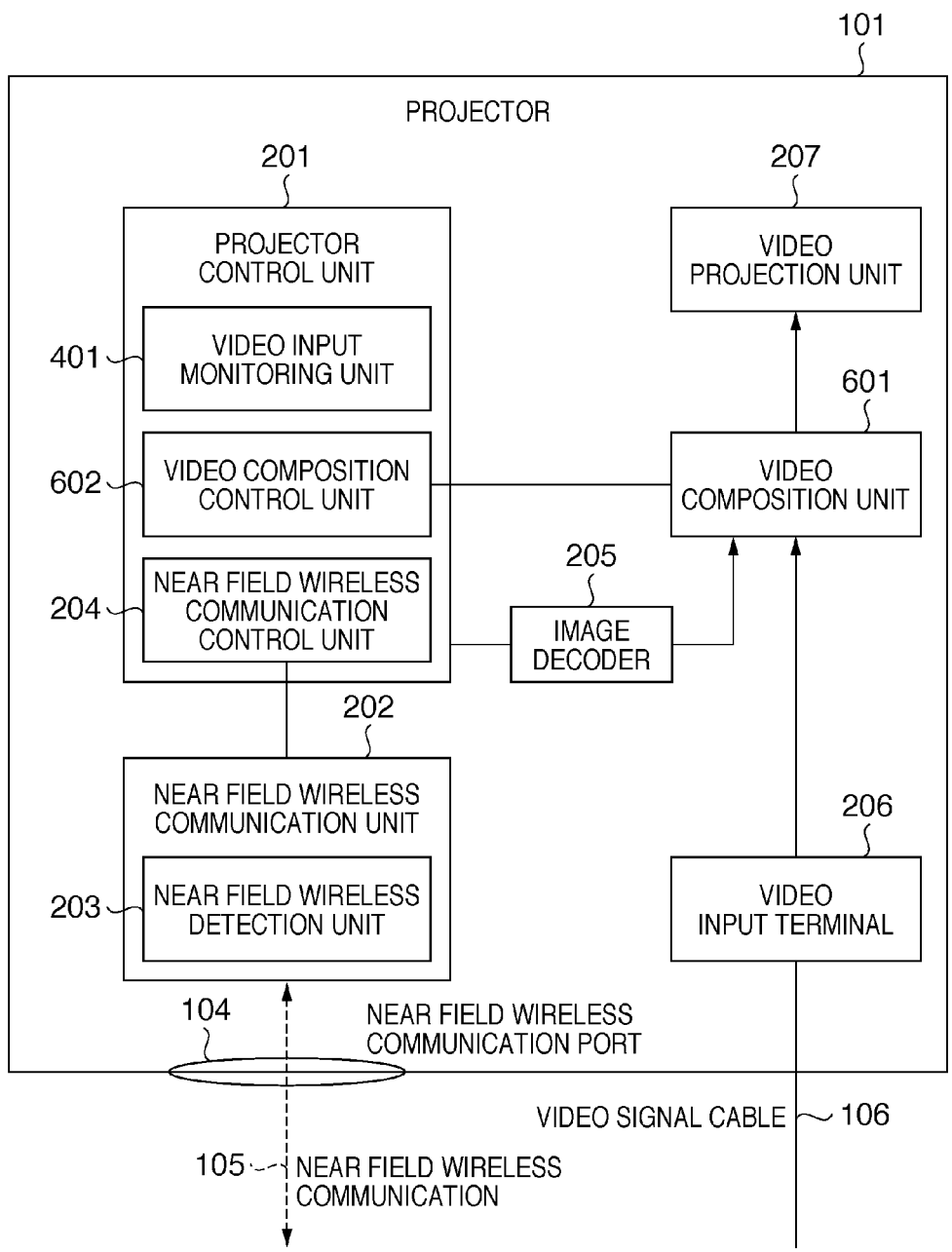
FIG. 9 is a block diagram showing a projector 101 according to the fourth embodiment of the present invention.

FIG. 9 is a block diagram showing a projector 101 according to the fourth embodiment.

Figure 10:
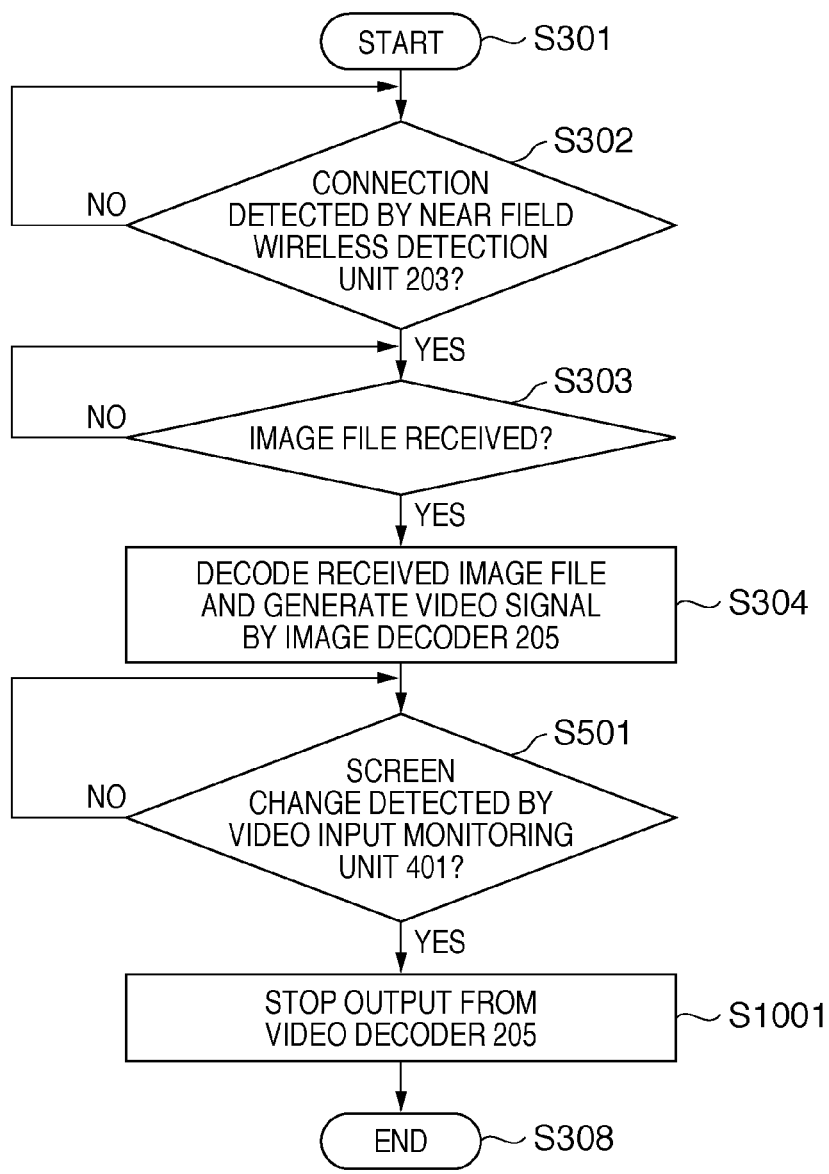
FIG. 10 is a flowchart illustrating the operation of the projector 101 according to the fourth embodiment of the present invention.

FIG. 10 is a flowchart illustrating the operation of the projector 101 according to the fourth embodiment.

As in the second embodiment, a video input monitoring unit 401 monitors whether a video input to a video input terminal 206 changes. Upon detecting a change amount equal to or more than a certain amount, the unit 401 generates a screen change detection event. In the fourth embodiment, in a state in which a video obtained by decoding an image file transferred from a digital camera 103 is composed on a video from a PC 102 and is then projected as in the third embodiment, the video input monitoring unit 401 is used to stop composition of the videos.

The fourth embodiment will be explained below with reference to the system configuration of FIG. 1, the block diagram of FIG. 9, and the flowchart of FIG. 10.

In the fourth embodiment, processing until the digital camera 103 is brought close to a near field wireless communication port 104, an image of the digital camera 103 and that of the PC 102 are composed, and a composed image is projected (step S304) is as described in the third embodiment. An operation when the operator of the PC 102 operates, for example, a pointing device to display a next page and there is a change in the display screen of the PC 102 while the projector 101 projects the composed image of the PC 102 and digital camera 103 will be explained below.

A change in the screen of the PC 102 changes a video signal to be input to the video input terminal 206. Upon detecting a change in the signal of the video input terminal 206, the video input monitoring unit 401 generates a screen change detection event. The projector control unit 201 of the projector 101 monitors a screen change detection event of the video input monitoring unit 401 (S501). Upon detecting a screen change detection event, a video composition control unit 602 controls a video composition unit 601 to output only the video signal from the video input terminal 206 to a video projection unit 207 (S1001). With the above operation, only an output video of the PC 102 is output to the video projection unit 207 and is then projected.

As in the third embodiment, a method in which the video composition unit 601 always composes a video signal from an image decoder 205 on that from the video input terminal 206 to control whether to output the signal from the image decoder 205 is also available.

According to this embodiment, it is possible to project an image file within the digital camera 103 without any switching operation only by bringing the digital camera 103 close to the projector 101. Especially, since an image of the digital camera 103 is composed on that of the PC 102 in the picture-in-picture format, it is possible to simultaneously check the original image of the PC 102. Furthermore, since only the original image of the PC 102 is projected only by changing the image of the PC 102, it is also possible to readily switch to display the image of the PC 102. That is, it is possible to reflect user's intention to switch a displayed image by, for example, changing a page projected in the PC 102.

Fifth Embodiment

In the fifth embodiment, in a state in which an image of a digital camera 103 and that of a PC 102 are composed and projected as in the third and fourth embodiments, the size of the image of the digital camera 103 is changed.

Figure 11:
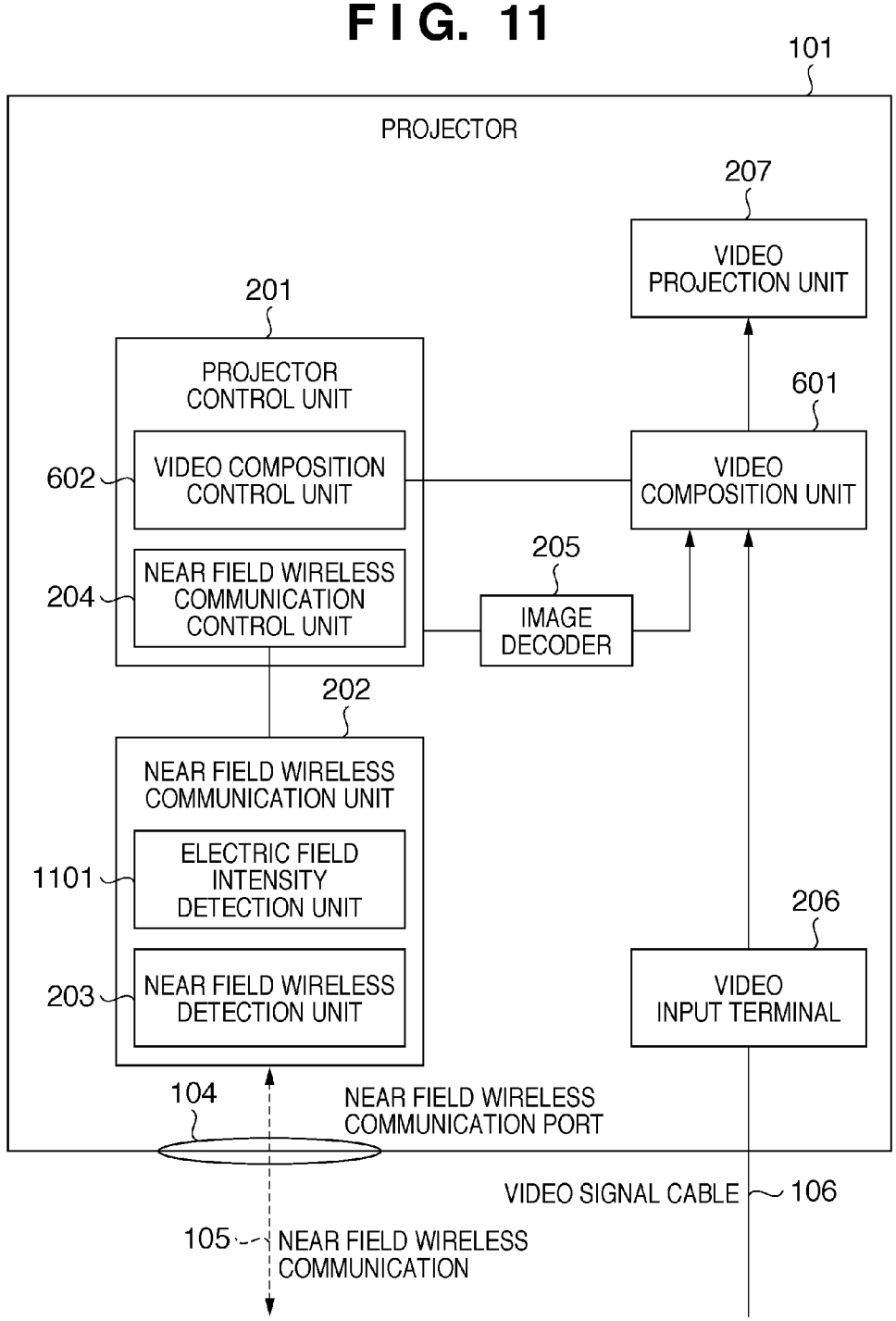
FIG. 11 is a block diagram showing a projector 101 when the fifth embodiment is implemented in the third embodiment.
Figure 12:
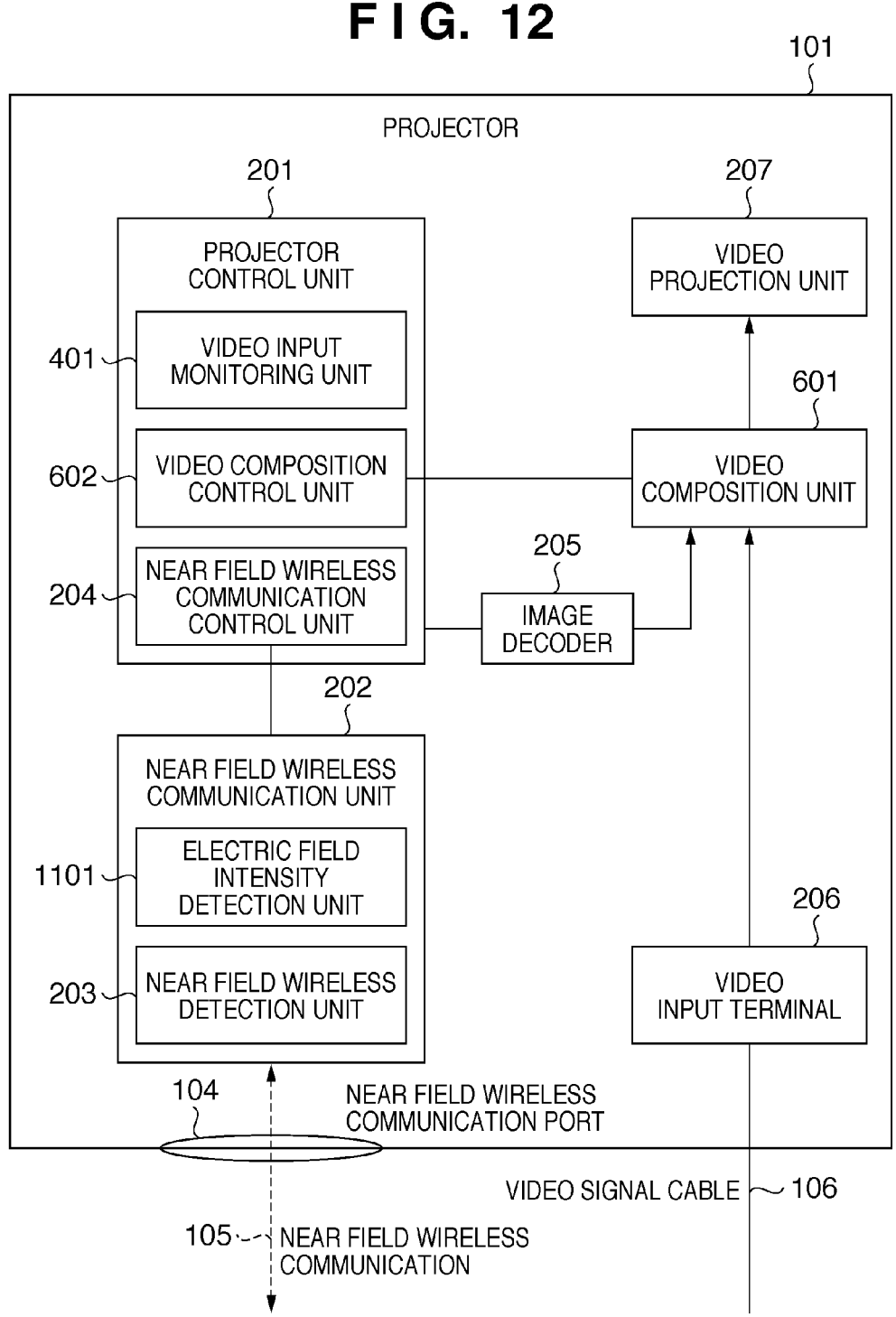
FIG. 12 is a block diagram showing a projector 101 when the fifth embodiment is implemented in the fourth embodiment.

FIG. 11 is a block diagram showing a projector 101 when the fifth embodiment is implemented in the third embodiment. FIG. 12 is a block diagram showing a projector 101 when the fifth embodiment is implemented in the fourth embodiment.

Reference numeral 1101 denotes an electric field intensity detection unit which detects the electric field intensity (field strength) of near field wireless communication 105. The electric field intensity detection unit 1101 determines the electric field intensity, and notifies a video composition control unit 602 of it.

The fifth embodiment will be explained below with reference to the block diagrams of FIGS. 11 and 12 and FIG. 8.

Referring to FIG. 11 or 12, the electric field intensity detection unit 1101 monitors the electric field intensity of the near field wireless communication 105. When the electric field intensity detection unit 1101 detects that the electric field intensity has increased, the video composition control unit 602 performs composition so that an image 802 of the digital camera in FIG. 8 becomes larger than in the current display state. When the electric field intensity detection unit 1101 detects that the electric field intensity has decreased, the video composition control unit 602 performs composition so that the image 802 of the digital camera in FIG. 8 becomes smaller than in the current display state. That is, when the user brings the digital camera 103 close to or away from a near field wireless communication port to change the electric filed intensity of the near field wireless communication 105, the displayed image of the digital camera 103 in the composed image can be made larger or smaller in accordance with the electric field intensity.

According to this embodiment, by bringing the digital camera 103 close to or away from the projector 101, it is possible to automatically change the size of an image of the digital camera 103, thereby readily adjusting the display size.

Sixth Embodiment

The projector 101 incorporates the near field wireless communication unit 202 in the first to fifth embodiments. As shown in FIG. 13, however, a near field wireless communication unit 202 may be connected to a projector 101 via a near field wireless communication unit connection cable 1301. This arrangement allows to locate a near field wireless communication port at a position away from the projector 101, thereby improving operability. For example, even if the projector is hung from the ceiling or located at a position away from the owner of the digital camera, it is possible to implement the first to fifth embodiments.

A video signal from an apparatus other than a PC 102 may be input to a video input terminal 206. Even if the projector 101 includes a plurality of video input terminals 206, the same operation is performed to obtain the same effects.

Even if an apparatus other than a digital camera 103 is connected by near field wireless communication 105, it is possible to obtain the same effects as long as the apparatus can store an image file. For example, the apparatus includes a cellular phone, PDA, or mobile storage.

Although the near field wireless communication 105 such as noncontact IC card wireless communication and NFC using electromagnetic induction, and communication using an induced electric field is used as a wireless interface in the first to fifth embodiments, another wireless communication may be used. For example, a wireless LAN or Bluetooth is available.

Furthermore, the system uses the projector 101 as a display apparatus. Even if another display apparatus such as a liquid crystal display or mobile display is used, it is possible to obtain the same effects.

The present invention may be achieved by supplying a recording medium which records computer program codes for implementing the above-described functions to a system or apparatus, and reading out and executing the program codes stored in the recording medium by a computer (or a CPU or MPU) of the system or apparatus. In this case, the program codes read out from the recording medium implement the functions of the above-described embodiments, and the recording medium which stores the program codes constitutes the present invention.

As a recording medium for supplying the program codes, a flexible disk, hard disk, optical disk, magnetooptical disk, CD-ROM, CD-R, magnetic tape, nonvolatile memory card, ROM, and DVD can be used.

The above-described functions are implemented when the computer executes the readout program codes. Also, the above-described functions may be implemented when an OS or the like running on the computer performs some or all of actual processes based on the instructions of the program codes. The OS is an abbreviation for Operating System.

Furthermore, the above-described functions may be implemented when the program codes read out from the recording medium are written in the memory of a function expansion board inserted into the computer or the memory of a function expansion unit connected to the computer, and the CPU of the function expansion board or function expansion unit performs some or all of actual processes based on the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-171247, filed Jun. 30, 2008, which is hereby incorporated by reference herein in its entirety.

The invention claimed is:

1. A display control apparatus comprising:
 a detection unit configured to detect, in accordance with a distance between an external apparatus and the display control apparatus, that wireless communication with the external apparatus has become possible or wireless communication with the external apparatus has become impossible;
 an input unit configured to input data from an information processing apparatus; and
 a display control unit configured to cause a display unit to display an image transmitted from the external apparatus prior to the data input by said input unit, in a case where said detection unit detects that the wireless communication with the external apparatus become possible while the data input by said input unit is being displayed, and to cause the display unit to display the data input by said input unit prior to the image transmitted from the external apparatus, in a case where said detection unit detects that the wireless communication with the external apparatus has become impossible while the image transmitted from the external apparatus is being displayed.

2. The apparatus according to claim 1, wherein said display control unit is configured to cause the display unit not to display the image transmitted from the external apparatus and to display the data input by said input unit, in a case where said detection unit detects that the wireless communication with the external apparatus has become impossible while the image transmitted from the external apparatus is being displayed.

3. The apparatus according to claim 1, wherein said display control unit is configured to cause the display unit not to display the data input by said input unit and to display the image transmitted from the external apparatus, in a case where said detection unit detects that the wireless communication with the external apparatus has become possible the while the data input by said input unit is being displayed.

4. The apparatus according to claim 1, wherein said display control unit controls display of an image obtained by composing the data input by said input unit and the image transmitted from the external apparatus, in a case where the image transmitted from the external apparatus is being displayed.

5. The apparatus according to claim 1, wherein said display control unit automatically causes the display unit to display the image transmitted from the external apparatus in accordance with a detection result of said detection unit, in a case where said detection unit detects that the wireless communication with the external apparatus has become possible in accordance with a user operation which brings the external apparatus close to the display control apparatus, and
 wherein said display control unit automatically causes the display unit not to display the image transmitted from the external apparatus, in a case where said detection unit detects that the wireless communication with the external apparatus has become impossible in accordance with a user operation which takes the external apparatus away from the display control apparatus while the image transmitted from the external apparatus is being displayed.

6. The apparatus according to claim 1, wherein said detection unit detects, using near field communication, that the wireless communication with the external apparatus has become possible.

7. The apparatus according to claim 1, wherein said display control unit causes the display unit to display an image which is being displayed on the external apparatus, in a case where said detection unit detects that the wireless communication with the external apparatus has become possible while the external apparatus displays the image.

8. The apparatus according to claim 1, wherein said input unit inputs the data from the information processing apparatus, which differs from the external apparatus, via a wired connection.

9. The apparatus according to claim 1, wherein said detection unit detects a wireless connection with the external apparatus and detects a disconnection of the wireless connection with the external apparatus.

10. The apparatus according to claim 1, wherein said detection unit detects that the wireless communication with the external apparatus has become possible in a case where a distance between the external apparatus and the display control apparatus has been changed from a distance at which the wireless communication is impossible to a distance at which the wireless communication is possible, and
 wherein said detection unit detects that the wireless communication with the external apparatus has become impossible in a case where a distance between the external apparatus and the display control apparatus has been changed from a distance at which the wireless communication is possible to a distance at which the wireless communication is impossible.

11. A display control method of a display control apparatus including a detection unit configured to detect wireless connection with an external apparatus and an input unit configured to input data, the display control method comprising:
- a detection step of detecting, in accordance with a distance between an external apparatus and the display control apparatus, that wireless communication with the external apparatus has become possible or wireless communication with the external apparatus has become impossible;
- an input step of inputting data from an information processing apparatus; and
- a display control step of causing a display unit to display an image transmitted from the external apparatus prior to the data input by said input step, in a case where said detection step detects that the wireless communication with the external apparatus has become possible while the data input by said input step is being displayed, and of causing the display unit to display the data input by said input step prior to the image transmitted from the external apparatus, in a case where said detection step detects that the wireless communication with the external apparatus has become impossible while the image transmitted from the external apparatus is being displayed.

12. A non-transitory computer-readable storage medium storing a program for having a computer execute a display control method according to claim 11.

* * * * *